(12) United States Patent
Holubka et al.

(10) Patent No.: US 8,586,149 B2
(45) Date of Patent: Nov. 19, 2013

(54) ENVIRONMENTALLY FRIENDLY REACTIVE FIXTURE TO ALLOW LOCALIZED SURFACE ENGINEERING FOR IMPROVED ADHESION TO COATED AND NON-COATED SUBSTRATES (75) Inventors: Joseph Walter Holubka, Livonia, MI (US); Larry P. Haack, Ann Arbor, MI (US); Ann Straccia, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 982 days.

(21) Appl. No.: 11/690,321

(22) Filed: Mar. 23, 2007

(65) Prior Publication Data
US 2007/0184201 A1 Aug. 9, 2007

Related U.S. Application Data (63) Continuation-in-part of application No. 10/464,265, filed on Jun. 18, 2003, now abandoned.

(51) Int. Cl.
*B05D 3/06* (2006.01)
*B05D 7/00* (2006.01)

(52) U.S. Cl.
USPC ............ 427/558; 427/409; 427/410; 156/108

(58) Field of Classification Search
USPC .................. 156/108; 527/534, 536, 539, 553; 427/534, 536, 539, 553, 407.1, 409, 427/410, 558
See application file for complete search history.

(56) References Cited

U.S. PATENT DOCUMENTS

| | | | |
|---|---|---|---|
| 3,811,925 A | 5/1974 | Nesteruk | |
| 4,682,711 A | 7/1987 | Reighard et al. | |
| 4,724,106 A | 2/1988 | Morimoto et al. | |
| 4,981,824 A | 1/1991 | Yonemura et al. | |
| 5,130,265 A | 7/1992 | Battilotti et al. | |
| 5,169,675 A | 12/1992 | Bartoszek-Loza et al. | |
| 5,185,182 A | 2/1993 | Brown | |
| 5,376,413 A | 12/1994 | Callebert et al. | |
| 5,434,214 A * | 7/1995 | Wolosen et al. | 524/720 |
| 5,437,894 A | 8/1995 | Ogawa et al. | |
| 5,580,616 A | 12/1996 | Niino et al. | |

(Continued)

FOREIGN PATENT DOCUMENTS

| | | |
|---|---|---|
| CN | 1551830 A | 12/2004 |
| EP | 0684281 | 11/1995 |

(Continued)

OTHER PUBLICATIONS

European Search Report, Dated Oct. 19, 2007, Ford Global Technologies, LLC, Application No. 07109042.7-1218, Reference p. 7974.

(Continued)

*Primary Examiner* — James Lin
(74) *Attorney, Agent, or Firm* — Damian Porcari; Brooks Kushman P.C.

(57) ABSTRACT

The present invention provides a method of increasing the surface energy of an article having a polymeric surface increasing the relative amount of nitrogen atoms or oxygen atoms within a portion of the surface to form a nitrogen or oxygen enriched surface layer. The method of the invention is advantageously applied to a vehicle body frame to facilitate adhesion of a windshield. In another embodiment of the invention a method for inhibiting sealer redeposition is provided in which a plastic component in an automobile is treated prior to being subjected to the various paint preprocessing baths.

19 Claims, 3 Drawing Sheets

(56) References Cited

U.S. PATENT DOCUMENTS

| | | | |
|---|---|---|---|
| 5,585,187 | A | 12/1996 | Shinonaga et al. |
| 5,670,261 | A | 9/1997 | Kameya et al. |
| 5,702,772 | A | 12/1997 | Skelly et al. |
| 5,730,922 | A | 3/1998 | Babb et al. |
| 5,820,808 | A | 10/1998 | van Oene et al. |
| 5,820,991 | A | 10/1998 | Cabo |
| 5,829,804 | A | 11/1998 | Saeki et al. |
| 5,837,958 | A | 11/1998 | Foernsel |
| 5,885,716 | A | 3/1999 | Nagasawa et al. |
| 5,916,674 | A | 6/1999 | Skelly et al. |
| 6,218,004 | B1 | 4/2001 | Shaw et al. |
| 6,306,514 | B1 | 10/2001 | Weikel et al. |
| 6,470,399 | B1 | 10/2002 | Tasler |
| 6,503,564 | B1 | 1/2003 | Fleming et al. |
| 6,517,657 | B1 | 2/2003 | Kuenzel et al. |
| 6,565,927 | B1 | 5/2003 | Drzal et al. |
| 6,565,945 | B1 | 5/2003 | Nishikori et al. |
| 6,649,225 | B2 | 11/2003 | Drzal et al. |
| 6,740,399 | B1 | 5/2004 | George et al. |
| 6,793,759 | B2 | 9/2004 | Chaudhury et al. |
| 6,800,336 | B1 | 10/2004 | Foernsel et al. |
| 6,821,379 | B2 | 11/2004 | Datta et al. |
| 6,841,263 | B2 | 1/2005 | Anderson et al. |
| 6,875,303 | B2 | 4/2005 | Samurkas et al. |
| 6,946,165 | B2 | 9/2005 | Brynolf et al. |
| 7,176,268 | B2 | 2/2007 | Lai et al. |
| 2001/0046561 | A1* | 11/2001 | Held et al. .......... 427/316 |
| 2002/0038925 | A1 | 4/2002 | Reimer et al. |
| 2002/0129833 | A1 | 9/2002 | Drzal et al. |
| 2003/0072946 | A1 | 4/2003 | Gasworth et al. |
| 2003/0091818 | A1 | 5/2003 | Banba et al. |
| 2003/0098114 | A1 | 5/2003 | Samurkas et al. |
| 2003/0104125 | A1 | 6/2003 | Busch et al. |
| 2003/0116281 | A1 | 6/2003 | Herbert et al. |
| 2003/0138573 | A1 | 7/2003 | Mikhael et al. |
| 2003/0155332 | A1 | 8/2003 | Datta et al. |
| 2003/0207099 | A1 | 11/2003 | Gillmor et al. |
| 2003/0207145 | A1 | 11/2003 | Anderson et al. |
| 2004/0009301 | A1* | 1/2004 | Xing et al. .......... 427/407.1 |
| 2004/0253471 | A1 | 12/2004 | Thiel et al. |
| 2005/0123705 | A1 | 6/2005 | Dronzek et al. |
| 2006/0118242 | A1 | 6/2006 | Herbert et al. |
| 2006/0162740 | A1 | 7/2006 | Kurunczi |
| 2006/0178483 | A1 | 8/2006 | Mehta et al. |
| 2006/0237030 | A1 | 10/2006 | Hensley |
| 2006/0263529 | A1 | 11/2006 | Lustiger et al. |
| 2006/0263564 | A1 | 11/2006 | Steyaert |
| 2007/0184201 | A1 | 8/2007 | Holubka et al. |

FOREIGN PATENT DOCUMENTS

| | | |
|---|---|---|
| EP | 0 370 779 B1 | 2/1996 |
| EP | 0990682 | 5/2000 |
| EP | 1429921 A | 6/2004 |
| EP | 1 524 248 A1 | 4/2005 |
| EP | 0 990 682 B1 | 11/2005 |
| EP | 1819843 A1 | 8/2007 |
| JP | 04140126 | 5/1992 |
| WO | 0060640 | 10/2000 |
| WO | 00/71340 | 11/2000 |
| WO | 03/000612 A1 | 1/2003 |
| WO | 03/048067 A1 | 6/2003 |
| WO | 03066932 A1 | 8/2003 |
| WO | 03078162 A1 | 9/2003 |
| WO | 03/106145 | 12/2003 |
| WO | 2004/037936 | 5/2004 |
| WO | 2004/037936 A1 | 5/2004 |
| WO | 2005059040 | 6/2005 |
| WO | 2005089957 | 9/2005 |

OTHER PUBLICATIONS

Modification of Polymeric Material Surfaces with Plasmas, Coates et al., Chapter IV of Plasma Processing of Advanced Materials MRS Bulletin, Aug. 1996.

Plasma Surface Treatment in Composites Manufacturing, Chang, Journal of Industrial Technology, vol. 15, No. 1 (Nov. 1998-Jan. 1999).

Surface Modification of Textile Fibers for Improvement of Adhesion to Polymeric Matrices: A Review, S. Luo et al.; Journal of Adhesion Science and Technology, (2002) 16(13), 1715-1735.

Chemical Reactions at Substrate Surface in Plasma Process, Y. Ando et al., Yosha (2002), 39(3), 23-127.

Improved Adhesion of Low-Density Polyethylene/EVA Foams Using Different Surface Treatments, M.D. Landete-Ruiz, et al., Journal of Adhesion Science and Technology (2002, 16(8), 1073-1101.

Surface Treatment of Biomedical Polymers for Enhanced Adhesion, V. Barron, et al. Materials Research Society Symposium Proceedings (2001), 662.

Plasma Surface Treatments of Melt-Extruded Sheets of Poly(L-lactic acid), T. Hirotsu, Polymer Engineering and Science (2002) 42(2), 299-306.

Study of Physico-Chemical Surface Treatments on Dyeing Properties of Polyamides. Part 1: Effect of Tetrafluoromethane Low Temperature Plasma, J. Yip, Coloration Technology (2002), 118(1), 26-30.

Plasma Surface Treatment of Aerospace Materials for Enhanced Adhesive Bonding, W. Leahy et al., Journal of Adhesion (2001), 773(3), 215-249.

Review of Progress n Surface Treatments for Magnesium Alloys, M. Yao, Cailiao Baohu (2001), 34(10), 19-21.

TOF-SIMS Ability to Quantify Surface Chemical Groups: Correlation with XPS Analysis and Spectrochemical Titration, N. Medard, et al., Belg. Surface and Interface Analysis (2001), 31(11), 1042-1047.

Surface Modification of Polymer Surfaces: Atmospheric Plasma Versus Vacuum Plasma Treatments, M. Shenton, Journal of Physics D: Applied Physics (2001), 34(18), 2761-2768.

Plasma Processing of Polymers for Enhanced Adhesion to Metals and Other Materials, F. Arefi-Khonsari et al., High Temperature Material Processes (2000), 4(4), 537-551.

Improvement of Adhesive Properties of Low Density Polyethylene Sheets and Poly(ethylene terephthalate) films by Various Surface Treatments, T. Ogawa et al., Kobunshi Ronbunshu (2000), 57(11), 708-714.

Surface Treatment of Polymer Matrix Composites for Adhesion, V. Barron et al., Proceedings of the Annual Meeting of the Adhesion Society (2000), 23rd 544-546.

Different Surface Treatments to Improve the Adhesion of Polypropylene, T. Zeiler, et al., Journal of Adhesion Science and Technology (2000), 14(5), 619-634.

Correlation Between Surface Tension and Physical Paint Properties, M. Osterhold et al., Progress in Organic Coatings (1998), 33(3-4), 197-201.

Plasma Surface Treatment for Improved Wettability and Rewettability, P. Spence, et al. INDA-TEC 97, International Nonwovens Technical Conference, Book of Papers, Cambridge, MA Sep. 8-10, 1997.

Ion Beam and Plasma Technology Development for Surface Modification at Los Alamos National Laboratory, H. Davis, et al. Materials Chemistry and Physics (1998), 54(1-3), 213-218.

Improvement of Adhesive Bonding of Thermoplastic Polymers by Different Surface Treatments, T. Zeiler et al., Macromolecular Symposia (1998), 126 (6th Dresden Polymer Discussion Surface Modification, 1997), 267-281.

A Review of Methods for Improving the Interfacial Adhesion Between Carbon Fiber and Polymer Matrix, L. Tang et al. Polymer Composites (1997), 18(1), 100-113.

Imaging Chemiluminescence Instrument for the Study of Heterogeneous Oxidation Effects in Polymers, G. Ablblad et al. Polymer Testing (1997), 16(1), 59-73.

Polymer Surface Modification by Plasmas and Photons, C.-M. Chan et al., Surface Science Reports (1996), 24(½), 1'-54.

Contact Angle Titration and ESCA Analysis of Polyester Surfaces Modified by Flame and Corona Surface Treatments, E. Wallace, Jr. et al., Annual Tech.Conf.-Soc. of Plastics Engs. (1995), 53rd(vol. 2), 2452-6.

(56) References Cited

OTHER PUBLICATIONS

Long-Term Performance of Adhesively Bonded Low Density Polyethylene After Various Surface Treatments for Enhanced Adhesion, D.Wu et al., Materials Science Forum (1995), 189-190(Interfaces II), 221-7.
Modification of Barrier Properties of Polymeric Films of LDPE and HDPE by Cold Plasma Treatment, A. Rossi et al. Journal of Polymer Engineering (1995), 14(2-3), 191-7.
Interface/Interphase Studies in Epoxy Matrix Composites, B. Okhuysen et al., Journal of Adhesion (1994), 45(1-4), 3-14.
Surface Treatment of Glass Fibers by Plasma, D. Wang et al., Xi'an Jiaotong Daxue Zuebao (1989), 23(5), 27-33 (Journal written in Chinese).
A System for in Situ Studies of Plasma-Surface Interactions Using X-ray Photoelectron Spectroscopy, J. Vossen et al., Journal of Vacuum Science & Technology, A:Vacuum, Surfaces, and Films (1983), 1(3), 1452-5.
Effects of Various Surface Treatments n Adhesive Bonding of Polyethylene, A. Devine et al., Adhesives Age (1969), 12 (5), 35-7.
Surface Treatment of Plastics by Plasmajet, K. Kiyozumi et al., Nippon Setchaku Kyokaishi (1970), 6(4), 265-72.
Formation of Epoxy-Diamine/Metal Interphases, A. Roche et al., International Journal of Adhesion and Adhesives (2002), 22(6), 431-441.
Method and Apparatus, With Redundancies, for Treating Substrate Plastic Parts to Accept Paint without Using Adhesion Promoters, Brynolf, Russell; Elberson, Michael D., US Pat. Appln. Publ. (2002).
Novel Metal Pretreatments for Improved Adhesion of Paints Using Plasma Methods, W. Van Ooij et al., Int'l Congress of Adh.Science and Tech., etc., Amsterdam, Oct. 16-20, 1995 (1998) Meeting Date 1995, 355-371.
Mechanisms of Atmospheric Corrosion of Precoated Sheets, C.Barreau et al., Comm'n of the Euro.Comm., [Report] EUR (1997), (EUR 16720), 1-114.
Surface Treatment of Propylene Resin Molded Articles for Improved Paint Coatability, Shinonage, Hideo; Sogabe, Satoru, Eur. Pat. Appln. (1995).
Selected pages from Website http://www.iap.fraunhofer.de (14 pages).
Selected pages from Website http://www.ifam.fhg.de (12 pages).
"Surface Modification of Polymeric Materials by Atmospheric Plasma Treatment", Y. Tsuchiya et al., Nippon Paint Co., Ltd., Proceedings-Int's Conf. in Org. Coatings, etc., 23rd, Athens, Jul. 7-11, 1997, pp. 257-270.
"On the Energy Balance of Substrate Surfaces During Plasma Clenaing of Lubricants", H. Kersten et al., Vacuum/vol. 48 (1997), 48(2), pp. 123-128.
SATAjet RP—http://www.sata.com/Produkte/produkt.jsp?index=02-01—5 Pages.
S. Gaur/G. Vergason, "Plasma Polymerization: Theory and Practice", Vergason Technology, Inc., Van Etten, NY.
http://www.americanelements.com/biox.html (Feb. 23, 2009).
European Search Report, dated Oct. 19, 2007, Ford Global Technologies, LLC, Application No. 07109042.7-1218, Reference P7974.
Ebru Akdogan et al., "A New Method for Immunosensor Preparation: Atmospheric Plasma Torch", Surface & Coatings Technology 201 (2006), pp. 2540-2546.
R. Prat et al., "Polymer Deposition Using Atmospheric Pressure Plasma Glow (APG) Discharge", Polymer 41 (2000), pp. 7355-7360.
UK Examination Report for Application GB0616204.4 dated Aug. 20, 2010.
Chinese Notification of First Office Action for Appln No. 200710109471.6 dated Sep. 20, 2010.
Autoglass Online, Industry Update, "Contamination Alleged, Accusations Fly", News & Events, Sep./Oct. 2004, www.glass.org/autoglass/maraprnews.htm.
SATAjet RP—http://www.sata.com/Produkte/produkt.jsp?index=02-01—5 Pages, 2007.
The Patent Office Patents Directorate—Patents Act 1977: Search Report under Section 17(5); Dec. 21, 2006; 3 Pages.
S. Gaur/G. Vergason, "Plasma Polymerization: Theory and Practice", Vergason Technology, Inc., Van Etten, NY, 2000.
Selected pages from Website http://www.iap.fraunhofer.de (14 pages), 2002.
Selected pages from Website http://www.ifam.fhg.de (12 pages), 2001.
English translation of JP Reference H4-140126, Published May 14, 1992, Inventor Takizawa., 8 Pages.
Fries., Society of Manufacturing Engineers, Cleveland, Ohio, Sep. 11-12, 1984, AD84-584, 15 Pages, "Product Assembly With Pressure Sensitive Adhesives.".
Szymberski, SAE Technical Paper Series Mar. 5-8, 2001, 2001-01-0844, 6 Pages, "Pressure Sensitive Adhesives".
American Elements: Bismuth Oxide Supplier & Tech Info, Feb. 23, 2009, pp. 1-3.

\* cited by examiner

ND REACTIVE FIXTURE TO ALLOW LOCALIZED SURFACE ENGINEERING FOR IMPROVED ADHESION TO COATED AND NON-COATED SUBSTRATES

CROSS-REFERENCE TO RELATED APPLICATIONS

This application is a continuation-in-part of U.S. application Ser. No. 10/464,265 filed Jun. 18, 2003. The entire disclosure of this application is hereby incorporated by reference.

BACKGROUND OF THE INVENTION

1. Field of the Invention

In at least one aspect, the present invention is related to methods of increasing the relative amounts of nitrogen and oxygen near the surface of a component made of a polymer.

2. Background Art

Surface-treatment technologies are of vital importance in the manufacturing industry for many applications that require materials specific surface properties. Surface modifications are used to improve chemical inertness, introduce surface cross-linking, increase surface conductivity, enhance dye-ability, and most significantly, to improve adhesion.

Traditionally, adhesives are used in the automotive industry to attach windshields to vehicles. Historically, after application of either electrocoat or primer paint layer to the vehicle body, masking tape is applied to the windshield bonding flange area, and removed after basecoat/topcoat application. A solvent-based pinch-weld primer is then applied, and the windshield is adhered using a urethane adhesive. The taping and primer add material costs, and subsequent costs associated with either manual or machine labor. Additionally, the use of a solvent-based windshield adhesive primer in a plant is both an environmental and safety concern. Driven by cost reduction and design requirements, current efforts within the automobile industry are being aimed at achieving primerless windshield bonding to topcoat. This is being accomplished through modifications in paint and/or adhesive formulation chemistry to attain desirable bonding characteristics. Suppliers will ultimately cascade reformulation and verification costs into the cost of producing a vehicle, but savings realized through the elimination of taping and priming should offset this price. Moreover, substantial cost savings can be realized through primerless side glass bonding by elimination of the hardware necessary for attachment through "butyl-and-bolt". Presently, primerless versions of DuPont Gen IV and Gen VI, PPG Carbamate, and BASF Ureclear are either used in production, or are soon scheduled for implementation. In the future, post-approval adjustments to topcoat formulation, which can be implemented to meet processing changes or cost reduction initiatives, would require a complete re-approval of the windshield bonding system to ensure that critical adhesive characteristics are maintained.

Most of the recent advances in clearcoat technology have been developed mainly for added resistance to effects of environmental etch and staining. To a large extent, this has been accomplished through modifications of bulk chemistry to remove functionality that is sensitive to the environmental factors causing etch. However, modifications of clearcoat formulation necessary to achieve primeness windshield bonding are accomplished either through incorporation of paint additives, or alterations to polymers that add bonding functionality to the topcoat surface. The consequence of these modifications is that environmental fallout could potentially bond more readily to this enhanced surface, resulting in appearance issues that could adversely affect customer satisfaction.

For glass bonding, good adhesion is essential only at the bonding flange. Thus alternatively, surface treatments of the topcoat, precisely in the bonding flange area, could potentially be utilized to enhance topcoat adhesion necessary to achieve primerless windshield bonding. This approach would not compromise the integrity of the entire painted vehicle surface. Similarly, a "universal" adhesive formulation that could bond to all topcoats would achieve this goal. However, the diversity in chemistries of topcoats available, added to the fact that formulation modifications can occur to paints during production over a period of time, makes the practicability of this later scenario unlikely.

Adhesion can be improved by increasing surface energy, increasing surface roughness, adding specific functional groups for specific interactions, or simply by removing weak boundary or contaminant layers that impede adhesion. For instance, surface treatments are being used to replace power-wash cleaning to remove mold release agents from plastic automotive headlamp lenses in order to facilitate bonding of a protective chip-resistance coating. In terms of bonding directly to coatings, surface treatments can eliminate the need for surface-active formulation additives to promote bonding, which potentially can interfere with fundamental processing issues relating to surface energy and wetability.

Some of the more common surface treatment technologies include UV radiation, ozone, corona discharge, flame, and low-pressure or vacuum plasma. Each method has certain advantages and disadvantages, depending upon the application. But plasma surface treatments are probably the most versatile, since they allow for the addition of different reactive gases that enable the construction of customized surfaces. Plasma surface treatments typically require a vacuum or low pressure for generation, which requires encapsulation of the entire object to be treated. Such spatial requirements limited the effectiveness of plasma treatments.

In a somewhat unrelated problem, each welded seam of an automobile body frame is overcoated with a sealant. During paint preprocessing, this sealant is observed to produce a residue that adheres to the various plastic automotive components during the various rinse cycles in the paint preprocessing. Such plastic parts components may optionally be coated with a paint prior to introduction of the vehicle body frame to the preprocessing steps. This phenomenon is typically referred to as sealant redeposition.

Accordingly, there exists a need for improved methods of adhering paint to a vehicle frame. Furthermore, there exists a need for a method of reducing sealant redeposition.

SUMMARY OF THE INVENTION

The present invention overcomes the problems of the prior art by providing in one embodiment a method for increasing the surface energy of a polymeric surface, and in particular for an article made at least in part from a polymeric material. The method of the present invention comprises increasing the relative amount of nitrogen atoms or oxygen atoms within a portion of the surface layer of the polymer to form a nitrogen or oxygen enriched surface layer with a second surface energy, wherein the second surface energy is at least 10% greater than the first surface energy and the second contact angle is at least 10% lower than the first contact angle.

In another embodiment of the present invention, a method of improving the adhesion of glass to portions of a vehicle frame is provided. The method of this embodiment comprises providing a painted vehicle frame having a paint layer. The paint layer comprises a polymer having carbon atoms and at least one of oxygen and nitrogen atoms and having a surface layer with a first surface energy and a surface with a first contact angle, the method comprising. The relative amount of nitrogen atoms or oxygen atoms within a portion of the surface layer of the polymer are increased to form a nitrogen or oxygen enriched surface layer with a second surface energy. The second surface energy is at least 10% greater than the first surface energy and the second contact angle is at least 10% lower than the first contact angle. Next, a piece of glass; is adhered to the vehicle frame with an adhesive. The method of this embodiment is advantageously used to improve the adhesion of windshields, sidelights, or backlights, to a vehicle body frame. Moreover, the method of this embodiment potentially allows the use of primerless windshield bonding.

In yet another embodiment of the present invention, a method of inhibiting sealer redeposition during processing of a vehicle frame having welded seams overcoated with a sealer is provided. The method of this embodiment comprises providing a polymeric component within a vehicle frame. The polymeric component comprises a polymer having carbon atoms and at least one of oxygen and nitrogen atoms and having a surface layer with a first surface energy and a surface with a first contact angle. The relative amount of nitrogen atoms or oxygen atoms is increased within a portion of the surface layer of the polymer to form a nitrogen or oxygen enriched surface layer with a second surface energy.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

In an embodiment of the present invention, a method of increasing the surface energy of a polymeric component is provided. The polymeric component used in the method of the invention comprises a polymer having carbon atoms and at least one of oxygen atoms and nitrogen atoms and having a surface layer with a first surface energy and a first contact angle. Preferably, the polymer has carbon, oxygen, and nitrogen atoms. The method of the present invention comprises increasing the relative amount of nitrogen atoms or oxygen atoms within a portion of the surface layer of the polymer to form a nitrogen or oxygen enriched surface layer with a second surface energy, wherein the second surface energy is at least 10% greater than the first surface energy and the second contact angle is at least 10% lower than the first contact angle. Moreover, the method of the present embodiment advantageously further comprises removing non-polar moieties from the surface layer. Typically, the step of increasing the relative amount of nitrogen or oxygen and the step of removing the non-polar moieties occur simultaneously. Although a number of methods might be employed to increase the relative amount of nitrogen or oxygen atoms within a portion of the surface layer of the polymer, suitable methods include exposing the surface layer to actinic radiation or an electron beam. In a preferred embodiment, the step of increasing the relative amount of nitrogen atoms or oxygen atoms within a portion of the surface layer of the polymer comprises exposing the surface layer to ultraviolet ("UV") light. Preferably, such ultraviolet light is generated by a high intensity ultraviolet light source with a concentrated output in the range from about 200 nm to about 280 nm. Preferably, robotics are used to deliver the UV radiation precisely along the perimeter of the windshield flange. Traditional UV arc lamps are compact enough to accomplish this task, but robotic application entails having a V system durable enough to withstand movement. UV arc lamps contain a filament, and are therefore prone to failures associated with vibrationally imposed stresses. The Fusion UV Systems irradiator technology utilizes microwave induced UV radiation. Bulbs used in these systems have no electrical connections, but instead contain microwave-active gasses that emit UV light when irradiated. Wing shields could be added to the lamp reflectors to keep light focused and isolated only to areas of interest. Also, while "in-focus" geometry requires precise control of distance to the treated surface, "out-of-focus" geometry allows for more error in treatment distance.

In a particularly preferred variation of the present embodiment, the step of increasing the relative amount of nitrogen atoms or oxygen atoms within a portion of the surface layer of the polymer comprises exposing the surface layer in air at atmospheric pressure to a cold plasma. A preferred cold plasma is the Openair™ plasma which uses pressurized air as the reagent gas. Openair™ plasmas generate a flume, similar in shape to a flame, which can be directed onto a substrate. The plasma flumes can be rotated, or added in series as a "multijet" to allow for treatment of larger surface areas. Moreover, this type of plasma can be applied robotically for surface modification of three-dimensional parts.

The method of the present invention advantageously increases the surface energy of the surface of the polymeric component from a first surface energy to a second surface energy. In particular, the second surface energy is at least 20% greater than the first surface energy. Similarly, the method of the present invention decreases the contact angle of the polymeric component from a first contact angle to a second contact angle. Specifically, the second contact angle is at least 20% lower than the first contact angle. Typically, the ratio of nitrogen atoms to carbon atoms in the surface layer is increased by at least 25% and the ratio of oxygen atoms to carbon atoms in the surface layer is increased by at least 5%.

Many different types of polymeric components may be treated by the method of the present embodiment. For example, the polymeric component may be the paint layer of a vehicle frame or a plastic part. The preferred paint layer will typically be a melamine cross-linked acrylic paint, an epoxy based paint, an epoxy-acid paint, an isocyanate-containing paint, and the like.

In another embodiment of the present invention, a method of improving the adhesion of glass to portions of a vehicle frame is provided. The method of this embodiment comprises providing a painted vehicle frame having a paint layer. The paint layer comprises a polymer having carbon and at least one of oxygen and nitrogen atoms and having a surface layer with a first surface energy and a surface with a first contact angle. Preferably, the polymer has carbon, oxygen, and nitrogen atoms. The relative amount of nitrogen atoms or oxygen atoms within a portion of the surface layer of the polymer are increased to form a nitrogen or oxygen enriched surface layer with a second surface energy. The second surface energy is at least 10% greater than the first surface energy and the second contact angle is at least 10% lower than the first contact angle. Next, a piece of glass is adhered to the vehicle frame with an adhesive. In addition to increasing the relative amounts of nitrogen and oxygen, non-polar moieties are typically from the surface layer. The automotive acrylic paint and urethane adhesive formulation chemistries presently available allow for either primed or primerless glass bonding to vehicle topcoats. The more resilient paints lack bonding functionality necessary to attract biological and environmental dirt and debris. PPG Carbamate and DuPont Gen VI clearcoat, typically require the use of a binder such as "Essex Betaseal 43532 Pinchweld Primer" to activate bonding to urethane adhesives. The preferred paint system for application of the method of this embodiment is preferably a melamine cross-linked acrylic paint.

As set forth above, the step of increasing the relative amount of nitrogen atoms or oxygen atoms within a portion of the surface layer of the polymer comprises exposing the surface layer to actinic radiation or an electron beam. In particular, the step of increasing the relative amount of nitrogen atoms or oxygen atoms within a portion of the surface layer of the polymer comprises exposing the surface layer to ultraviolet light. Preferably, the ultraviolet light is generated by a high intensity ultraviolet light source with a concentrated output in the range from about 200 nm to about 280 nm. In a variation of this embodiment, the step of increasing the relative amount of nitrogen atoms or oxygen atoms within a portion of the surface layer of the polymer comprises exposing the surface layer in air at atmospheric pressure to a cold plasma.

The method of this embodiment advantageously increases the surface energy of the painted surface from a first surface energy to a second surface energy. Typically, the second surface energy is at least 20% greater than the first surface energy. In particular, the second surface energy is at least 20% greater than the first surface energy. Similarly, the method of the present invention decreases the contact angle of the polymeric component from a first contact angle to a second contact angle. Specifically, the second contact angle is at least 20% lower than the first contact angle. The benefits of the present embodiment are obtained by increasing the relative amount of nitrogen and oxygen atoms as compared to carbon atoms. In particular, the ratio of nitrogen atoms to carbon atoms in the surface layer is increased by at least 25% and the ratio of oxygen atoms to carbon atoms in the surface layer is increased by at least 5%.

A suitable location for utilization of the method of the present invention is prior to windshield installation. This location allows for minimum time between treatment and adhesive application. This minimizes contamination from handling prior to bonding. With a windshield flange perimeter of about 20 feet, it would be necessary to UV treat at approximately 40 feet per minute velocity.

In yet another embodiment of the present invention, a method of inhibiting sealer redeposition during processing of a vehicle frame having welded seams overcoated with a sealer is provided. The method of this embodiment comprises providing a polymeric component within a vehicle frame. The polymeric component comprises a polymer having carbon atoms and at least one of oxygen and nitrogen atoms and having a surface layer with a first surface energy and a surface with a first contact angle. Preferably, the polymer has carbon, oxygen, and nitrogen atoms. Typically, the polymeric component is a plastic component. The relative amount of nitrogen atoms or oxygen atoms is increased within a portion of the surface layer of the polymer to form a nitrogen or oxygen enriched surface layer with a second surface energy. The second surface energy is at least 10% greater than the first surface energy and the second contact angle is at least 10% lower than the first contact angle. The vehicle frame is then typically exposed to one or more paint pretreatment baths, some of which typically contain phosphate. The vehicle frame is then typically rinsed with water. During this rinsing, depositing of sealer residue on the polymeric component is inhibited. In addition to increasing the relative amounts of nitrogen and oxygen, non-polar moieties are typically from the surface layer.

The following examples illustrate the various embodiments of the present invention. Those skilled in the art will recognize many variations that are within the spirit of the present invention and scope of the claims.

EXPERIMENTS

1. Plasma Surface Treatment Experiments a. Materials

DuPont Gen VI and PPG Carbamate acrylic melamine basecoat/clearcoat paint systems were evaluated. Painted panels (4×12 inch EG steel) were obtained directly from the suppliers. All panels were coated with a full paint stack of electrocoat, primer, and basebcoat/clearcoat. The electrocoat and primer paints consisted of the identical materials used in production with the representative basecoats. All bake conditions were nominal.

b. Plasma Treatment System

Materials were treated with plasma using a table-top FLUME™ Plasma Pre-Industrial Evaluation Systems, manufactured by PlasmaTreat North America, Inc. The system utilizes a FLUME™ Jet RD1004 head that emits a single plasma stream, which in rotation mode, turns at 2000 revolutions per minute to effectively produce a 1¼-inch treatment width. The plasma treatment system contains a moving platform that allows for treatment speeds up to 3.3 feet per second. Treatments were carried out under rotation conditions using an air pressure of 45 psi, a current of 8.5 amps, and a voltage of 14 kV.

c. Surface Analysis.

A Kratos AXIS 165 Electron Spectrometer manufactured by Kratos Analytical, Manchester, England was used to obtain x-ray photoelectron spectroscopy (XPS). The base pressure of the spectrometer analyzer was $5 \times 10^{-10}$ Torr. Photoelectrons were generated using a monochromatic Al Ka (1486.6 eV) X-ray excitation source operated at 15 kV, 20 mA (300 W) and collected using hybrid mode magnification with the analyzer at a 20 eV pass energy for high resolution spectra, and a 80 eV pass energy for elemental surveys. High-resolution C 1 s core level spectra were acquired for speciation of carbon oxidation chemistry. Quantification of survey data was accomplished by means of routines based on Scofield photoionization cross-section values. A least-squares based fitting routine, supplied by the manufacturer, was used to peak fit the high-resolution core level spectra. This routine was allowed to iterate freely on the peak positions, peak heights, and peak widths. A FWHM of approximately 1.1 eV was achieved for the components of the peak fits. Binding energies were referenced to the aliphatic C 1 s line at 284.6 eV.

Surface analysis was performed on PPG Carbamate and DuPont Gen VI clearcoats using x-ray photoelectron spectroscopy. Measurements were made initially, and after exposure to the plasma at a range of treatment velocities. The O/C atomic ratio was measured to assess surface oxidation by oxygen uptake. The N/C atomic ratio was measured to monitor the amount of melamine enrichment induced by plasma treatment. The percent increase in O/C and N/C ratio as a function of plasma treatment for PPG Carbamate is given in FIG. 1. The resonance times of 0.6, 1.1, 2.3, 4.5 and 9.1 seconds per foot; translate to treatment speeds of 1.8, 0.87, 0.44, 0.22 and 0.11 feet per second, respectively. The XPS measurements show that the O/C ratio increases rapidly with treatment, maximizes at 1.1 seconds per foot, and then drops and levels off above 2.3 seconds per foot resonance time. In contrast, the N/C ratio increases rapidly with treatment, but continues to rise and eventually level off at resonance times above 4.5 seconds per foot (0.22 feet per second). Nitrogen and oxygen ratios for DuPont Gen VI showed similar trends and are provided in FIG. 2. The initial rise in O/C ratio with plasma treatment may reflect surface oxidation. The O/C ratio drops at higher plasma treatment levels is most likely due to extended oxidation at portions of the clearcoat where there is eventual cleavage and evolution of $CO_2$, thus depleting oxygen at twice the rate of carbon. The continuous increase in N/C ratio with plasma treatment is explained by the surface enrichment of melamine. The underlying melamine crosslinker is exposed by oxidation, cleavage, and volatilization of surface acrylic moieties.

XPS high-resolution C 1 s core level spectra were acquired from the PPG Carbamate and DuPont Gen VI clearcoats before and after exposure to plasma. The peaks identified under the C 1 s envelope are assigned to aliphatic, ether or hydroxyl, melamine, and carboxylate. Most of the increase in area under the peak envelopes is observed after the initial plasma treatment. The consecutive higher plasma exposures showed less difference in peak area. This is consistent with the quantitative O/C and N/C ratio data from FIGS. 1 and 2. The ether/hydroxyl peak and the carboxylate peak account for the increased oxygen observed with plasma treatment. The melamine peak accounts for the increase in nitrogen.

Enhanced bonding induced through plasma treatment is made possible by the formation of functional groups with exchangeable hydrogens. Isocyanate crosslinking agents are commonly used in polymeric systems and urethane adhesives, as they react strongly to moieties containing exchangeable hydrogen. The XPS C 1 s core level data revealed the formation of hydroxyl, amine (melamine), and carboxylate functional groups. All contain exchangeable hydrogen.

Urea linkages are by far the strongest and most resilient couplings. The paint system that forms amine groups most readily with plasma treatment would likely also be the most bondable.

d. Surface Energy Measurements.

The surface tension of the test panels was assessed using a Surface Energy Test Ink Kit supplied by PlasmaTreat North America, Inc. The test liquids in the kit consist of methanol/water standard mixtures for measuring surface tensions from 28 through 72 dynes. Surface tension is determined by observing the highest dyne level mixture that wets the surface for at least two seconds before receding.

Figure 1:
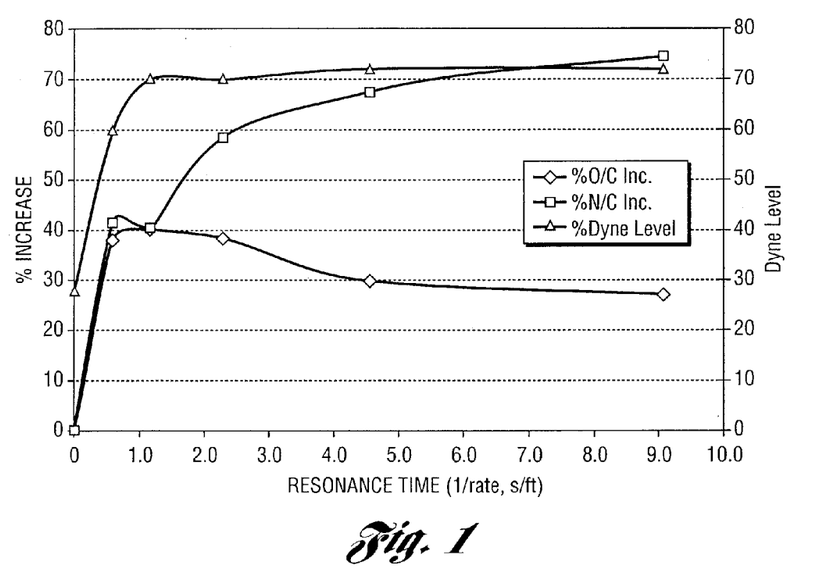
FIG. 1 provides O/C and N/C percent increases of PPG Carbamate clearcoat plasma treated as determined by XPS at resonance times of 0, 0.6, 1.1, 2.3, 4.5 and 9.1 seconds per foot, overlaid with dyne level measurement at each treatment level.
Figure 2:
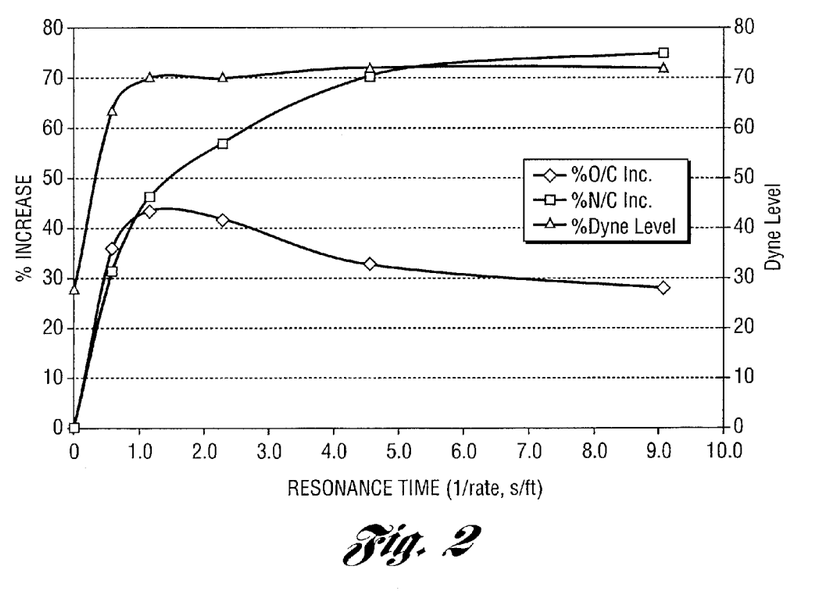
FIG. 2 provides O/C and N/C percent increases of DuPont Gen VI clearcoat plasma treated as determined by XPS at resonance times of 0, 0.6, 1.1, 2.3, 4.5 and 9.1 seconds per foot, overlaid with dyne level measurement at each treatment level.

FIGS. 1 and 2 also provide surface energy measurements acquired from the paint surfaces before and after the plasma treatments. The plots are nearly identical for each paint system. The dyne level quickly approaches 70, leveling off to eventually achieve a value of 72 at 4.5 seconds per foot resonance time. Thus the increased surface oxidation measured by XPS due to the formation of highly oxidized functional groups is manifested as an increased surface polarity. This accounts for the increase in dyne level. Note that, as a function of plasma exposure, the measured dyne level increases and then plateaus quickly, unlike the equivalent XPS elemental ratio data. Thus while the dyne level measurements serve well as a qualitative confirmation of treatment, the XPS measurements more accurately quantify chemical changes that progress with increased level of surface treatment.

2. UV Surface Treatment Experiments a. Materials

The basecoat/clearcoat systems evaluated for UV treatments were five of the major acrylic systems currently used in automotive manufacturing: DuPont Gen IV, DuPont Gen VI, PPG carbamate, PPG high solids, and BASF Ureclear. Painted panels (4×12 inch EG steel) were obtained directly from the suppliers. Each of these test panels were coated with a full paint stack of electrocoat, primer, and basecoat/topcoat. The electrocoat and primer paints consisted of the identical materials used in production with the representative basecoats. All bake conditions were nominal.

b. UV Irradiation Experimental Setup and Procedure

The test panels were exposed to UV radiation using a Fusion UV Systems, Inc., F300 lamp system (irradiator) employing a standard 6-inch H-type bulb coupled with a Model LC-6B benchtop conveyor. All panels were passed under the UV bulb at a belt speed of 3 feet per minute. Power output was calibrated using a 4-channel (UVC, UVB, UVA and UVV) high-energy UV EIT radiometer Power Puck®. Higher intensities were achieved with the lamp perpendicular to test panel travel in the standard "in-focus" position, and higher dosages were achieved with the lamp positioned "out-of-focus" with end reflectors installed.

Paint panels were subjected to UV, using both H and H+ type bulbs, at irradiances of 1, 3, and 5 $W/cm^2$, with exposures of 2, 4, 8, and 16 J/cm at each irradiance level. The $H^+$ bulb exhibits higher outputs in the more energetic UVC and UVB regions, from 250-320 nm wavelength. For UV exposure, the paint panels were divided into four quadrants. Each quadrant received the same irradiance level, but at different exposures. A template was used to protect the other quadrants of the panel while the one section was exposed to UV.

A single I600 irradiator was used to determine the proper amount of UV energy and irradiance needed to fulfill the test parameters. The irradiator was placed in a large DRS conveyer. Before any UV pretreatment exposure testing was done, radiometry data was collected. The irradiator was placed at different focal length and positions in order to match the desired irradiance levels required for the tests. An EIT radiometer power puck was used to measure the irradiance value; a line speed of 20 fpm was used to collect all the radiometer data. For the 1 $W/cm^2$ irradiance level the bulb was placed in the 209-position and the irradiator was placed 7.0 inches from the surface of the conveyer. The irradiator was orientated so that the bulb axis of the lamp was parallel with respect to the conveyer belt travel and the power level reduced to 75%. Once the radiometer measurements were acquired, the line speed required to achieve the 2, 4, 8, and 16 $J/cm^2$ of total energy was calculated. Next the power level was increased back to 100% and the irradiator was lowered so that the distance between the irradiator and the conveyer was 4.0 inches. This adjustment changed the irradiance output to 3 $W/cm^2$. Again, the irradiator was orientated so the bulb axis was parallel with respect to the conveyer belt travel. Next, the EIT radiometer power puck was placed on the conveyer. With the newly acquired energy measurements the line speeds needed to achieve the various energy levels was calculated. Next the bulb was placed in the standard focus position and the irradiator placed 2.1 inches from the conveyer belt surface. With this configuration an irradiance of 5 W/cm² was achieved. The irradiator was orientated so that the bulb axis was offset by 15 from the conveyer belt travel. With this orientation more radiometry measurements and energy calculations were made to determine the proper line speed to expose the substrate with the desired amount total UV energy.

c. Adhesion Testing

Adhesion improvements from UV treatments were assessed using Essex urethane adhesive Betaseal 57302. Immediately after exposure, adhesive was applied directly, without pinch-weld primer, to the acrylic topcoats using a double 6×6×200 mm bead, and allowed to cure for a minimum of 72 hours. The Quick Knife Adhesion Test (SAE J 1720) was performed on one bead, and then on the other bead after exposure to 95% humidity at 95° F. for 10 days.

The quick knife adhesion test results of initial UV exposure experiments are shown in Table 5. Samples were passed under the UV irradiator at belt speeds from 3 to 50 feet per minute. When the lamp bulb is positioned at the high-intensity "in-focus" position, good adhesion was achieved only at the slower belt speed of 3 feet per minute. Better adhesion was achieved at higher speeds by positioning the lamp bulb "out-of-focus". For example, good adhesion was achieved with Gen IV at belts speeds as high as 21 feet per minute. The adhesion results of Table 5 show that the maximum velocity achievable with PPG Carbamate was 15 feet per minute.

TABLE 5

Quick Knife Adhesion Test results of topcoats after exposure to UV radiation both in-focus (bulb perpendicular at 2.1 in. distance) and out-of-focus (bulb parallel at 4.0 in. Distance)

| Belt Speed (ft/min) | UV Exposure Intensity (Watts/cm²) | Dosage (Joules/cm²) | Adhesion Results | | | |
|---|---|---|---|---|---|---|
| | | | Gen IV | GEN VI | PPG Carb | PPG HS |
| Bulb: Perpendicular In-Focus (2.1 in.) | | | | | | |
| 50 | 4.89 | 0.74 | — | — | — | Failed |
| 34 | 4.89 | 1.09 | Failed | Failed | Failed | Failed |
| 27 | 4.89 | 1.37 | Failed | Failed | Failed | — |
| 21 | 4.89 | 1.76 | Failed | Failed | Failed | — |
| 15 | 4.89 | 2.47 | Partial | Failed | Failed | — |
| 9 | 4.89 | 4.11 | Partial | Failed | Partial | — |
| 3 | 4.89 | 12.33 | Passed | Passed | Passed | Passed |
| Bulb: Parallel Out-Of-Focus (4.0 in.) | | | | | | |
| 50 | 1.49 | 1.35 | Failed | Failed | Failed | Failed |
| 34 | 1.49 | 1.98 | Partial | Failed | Partial | Failed |
| 27 | 1.49 | 2.49 | Partial | Failed | Partial | Partial |
| 21 | 1.49 | 3.21 | Passed | Failed | Partial | Partial |
| 15 | 1.49 | 4.49 | Passed | Failed | Passed | Partial |
| 9 | 1.49 | 7.48 | Passed | Partial | Passed | Passed |
| 3 | 1.49 | 22.45 | Passed | Passed | Passed | Passed | d. X-Ray Photoelectron Spectroscopy

Figure 3:
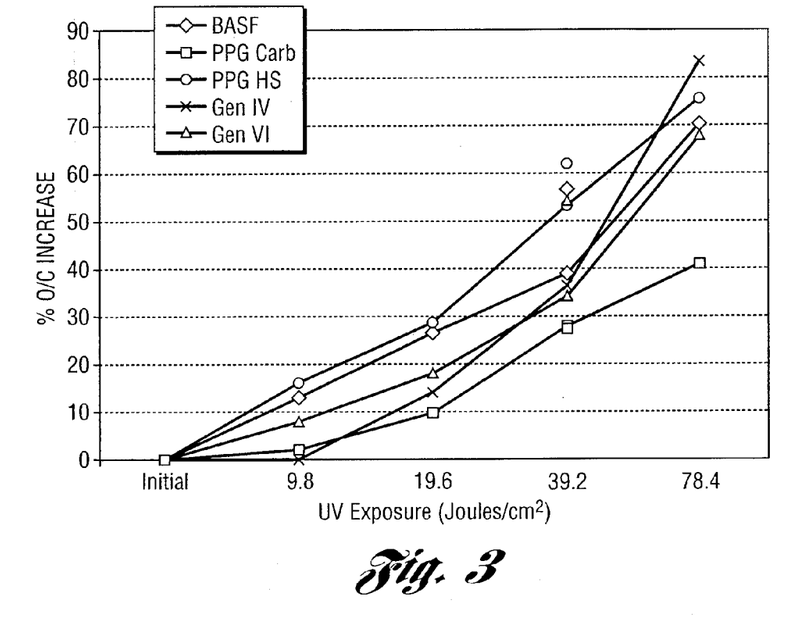
FIG. 3 provides O/C increase of paint clearcoats determined by XPS as of function of UV exposure.
Figure 4:
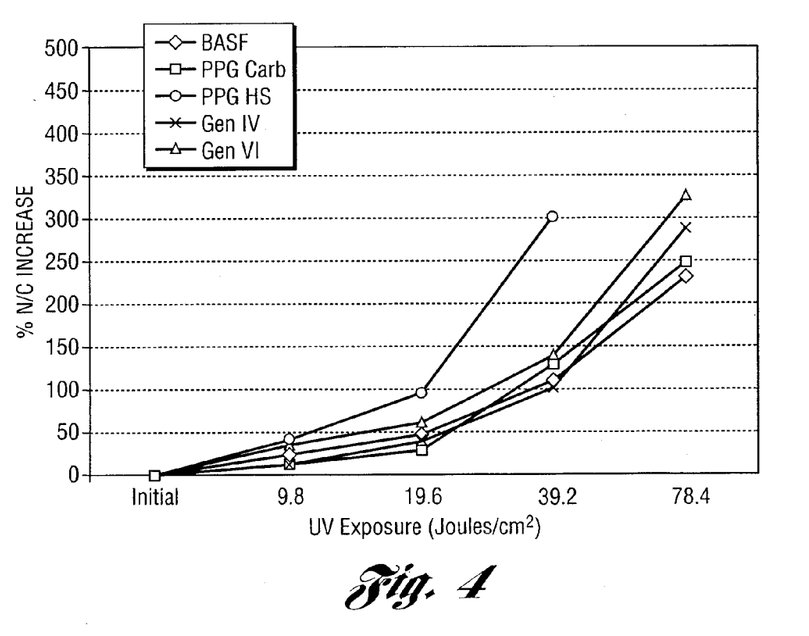
FIG. 4 provides N/C increase of paint clearcoats determined by XPS as of function of UV exposure.

Surface measurements by XPS were performed as set forth above. XPS were only performed on the panels exposed to the H⁺ bulb. XPS provided survey data for surface elemental compositions, and high-resolution core level spectra for speciation of carbon oxidation chemistry. Chemistry of the treated clearcoats was evaluated by XPS, which probes 20-50 angstroms into a surface, on all samples subjected to the H⁺ bulb. FIGS. 3 and 4 provide the O/C and O/N atomic ratio as a function of UV treatment. FIG. 3 shows the relative concentration of oxygen as a function of UV exposure for the five paint clearcoats studied. All clearcoats revealed an increase in oxygen concentration with increasing UV exposure. PPG carbamate had the least amount of oxygen increase. Interestingly, the paints increased exponentially in nitrogen concentration with exposure time (FIG. 4). The XPS analysis reveals that the surface nitrogen concentration increased more rapidly than oxygen concentration.

e. Contact Angle Measurements

Figure 5:
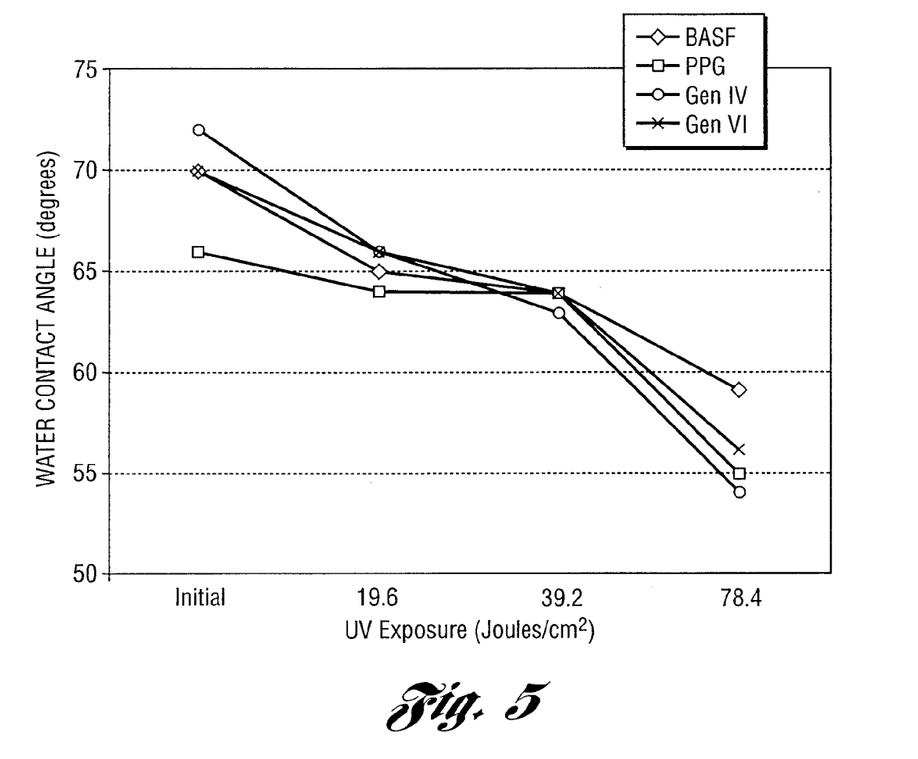
FIG. 5 provides contact angle for paint clearcoats as a function of UV exposure.

Surface wetability was assessed by performing contact angle measurements, carried out using deionized water as the testing liquid. Lower contact angle measurements correlate with increased surface wetability, and a higher surface polarity. However, surface roughening can also increase surface energy, but does not necessarily improve adhesion since loose debris such as low molecular weight oxidized material ("LM-WOM") will "roughen" a surface and can actually act as a boundary layer to impede adhesion. FIG. 5 provides a plot of contact angles before and after UV treatment. A noticeable drop in contact angle occurs after treatment with 19.6 joules of UV. The contact angle drops only slightly at 39.2 joules, and then drops to a great extent again after treatment to 78.4 joules. The large drop in contact is due to the formation of surface LMWOM. The plateauing between 19.2 and 39.2 joules would imply that surface changes within this range of UV dosages relates to chemical modifications only.

While the best mode for carrying out the invention has been described in detail, those familiar with the art to which this invention relates will recognize various alternative designs and embodiments for practicing the invention as defined by the following claims.

What is claimed:

1. A method of increasing the surface energy of a polymer surface layer including a first surface energy and a polymer having carbon, oxygen and nitrogen atoms, the method comprising:
   exposing the surface layer to an ultraviolet C or B light source having an energy ranging from 19.6 Joules to 39.2 Joules to form a nitrogen and oxygen enriched surface layer with a second surface energy at least 10% greater than the first surface energy, the nitrogen and oxygen enriched surface layer having an at least 10 percent increase in oxygen-to-carbon (0/C) and an at least 25 percent increase in nitrogen-to-carbon (N/C); and
   positioning the ultraviolet C or B light source in a predetermined out-of-focus position, the ultraviolet C or B light source being installed with end reflectors.

2. The method of claim 1, further comprising:
   removing non-polar moieties from the surface layer during the exposing step.

3. The method of claim 1, wherein the second surface energy is at least 20% greater than the first surface energy.

4. The method of claim 1, wherein the ultraviolet C or B light source has a wavelength ranging from 250 nm to 320 nm, and the nitrogen and oxygen enriched surface layer has a second contact angle that is at least 20% lower than a first contact angle of the surface layer prior to the ultraviolet light exposure.

5. The method of claim 1, wherein the polymer surface layer is a layer disposed on a vehicle frame paint stack exterior.

6. The method of claim 5, wherein the layer includes a topcoat selected from the group consisting of a melamine cross-linked acrylic paint, an epoxy based paint, an epoxy-acid paint, and an isocyanate-containing paint.

7. The method of claim 1, wherein the polymer surface layer is a plastic component.

8. A method of inhibiting sealer redeposition during processing of a vehicle frame having welded seams over coated with a sealer, the method comprising:

providing a polymeric component within a vehicle frame having a surface layer including a first surface energy and a polymer having carbon, oxygen and nitrogen atoms;

exposing the surface layer to an ultraviolet C or B light source having an energy ranging from 19.6 Joules to 39.2 to form a nitrogen and oxygen enriched surface layer, the nitrogen and oxygen enriched surface layer having a second surface energy at least 10% greater than the first surface energy and an at least 10 percent increase in oxygen-to-carbon (O/C) and an at least 25 percent increase in nitrogen-to-carbon (N/C);

positioning the ultraviolet C or B light source in a predetermined out-of-focus position, the ultraviolet C or B light source being installed with end reflectors;

exposing the vehicle frame to one or more paint pretreatment baths; and rinsing the vehicle frame with water, wherein depositing of sealer residue on the polymeric component is inhibited.

9. The method of claim 8, further comprising:
removing non-polar moieties from the surface layer.

10. The method of claim 8, wherein the exposing step further includes exposing the surface layer with ultraviolet light generated by a high intensity ultraviolet light source with a concentrated output in the range from about 250 nm to about 320 nm.

11. The method of claim 8, wherein the second surface energy is at least 20% greater than the first surface energy and the nitrogen and oxygen enriched surface layer has a second contact angle that is at least 20% lower than the surface layer first contact angle.

12. The method of claim 8, wherein the polymeric component is a plastic component.

13. The method of claim 8, wherein the polymeric component is a painted plastic component.

14. A method of improving adhesion, the method comprising:

providing a painted vehicle frame having a paint layer including a surface layer, the surface layer including a first surface energy and a polymer having carbon, oxygen and nitrogen atoms, and exposing the surface layer to an ultraviolet C or B light source having an energy ranging from 19.6 Joules to 39.2 Joules to form a nitrogen and oxygen enriched surface layer, the nitrogen and oxygen enriched surface layer having a second surface energy at least 10% greater than the first surface energy and an at least 5 percent increase in oxygen-to-carbon (O/C) and an at least 25 percent increase in nitrogen-to-carbon (N/C); and positioning the ultraviolet C or B light source in a predetermined out-of-focus position, the ultraviolet C or B light source being installed with end reflectors.

15. The method of claim 14, further comprising:
removing non-polar moieties from the surface layer.

16. The method of claim 14, wherein the exposing step further includes exposing the surface layer with ultraviolet light generated by a high intensity ultraviolet light source with a concentrated output in the range from about 200 nm to about 280 nm.

17. The method of claim 14, wherein the second surface energy is at least 20% greater than the first surface energy.

18. The method of claim 14, wherein the paint layer includes a melamine cross-linked acrylic paint.

19. The method of claim 14, further comprising the step of adhering a piece of glass to the vehicle frame with an adhesive.

* * * * *